US010991031B2

(12) United States Patent
Nizam et al.

(10) Patent No.: US 10,991,031 B2
(45) Date of Patent: *Apr. 27, 2021

(54) SYSTEM AND METHOD FOR PROVIDING COMMERCIAL FUNCTIONALITY FROM A PRODUCT DATA SHEET

(71) Applicant: Bluesky Datasheets, LLC, Henderson, NV (US)

(72) Inventors: Jamil Nizam, Henderson, NV (US); Amir Nizam, Los Angeles, CA (US)

(73) Assignee: Bluesky Datasheets, LLC, Henderson, NV (US)

(*) Notice: Subject to any disclaimer, the term of this patent is extended or adjusted under 35 U.S.C. 154(b) by 458 days.

This patent is subject to a terminal disclaimer.

(21) Appl. No.: 15/789,016

(22) Filed: Oct. 20, 2017

(65) Prior Publication Data

US 2018/0040058 A1 Feb. 8, 2018

Related U.S. Application Data

(63) Continuation of application No. 13/840,584, filed on Mar. 15, 2013, now Pat. No. 9,799,066.

(51) Int. Cl.
*G06Q 30/00* (2012.01)
*G06Q 30/06* (2012.01)

(52) U.S. Cl.
CPC ......... *G06Q 30/0633* (2013.01); *G06Q 30/06* (2013.01)

(58) Field of Classification Search
CPC ............................ G06Q 30/0633; G06Q 30/06
(Continued)

(56) References Cited

U.S. PATENT DOCUMENTS 5,946,662 A  8/1999  Ettl et al.
5,960,411 A  9/1999  Hartman et al.
(Continued)

FOREIGN PATENT DOCUMENTS

CN   101553836   10/2009
CN   102760267   10/2012
(Continued)

OTHER PUBLICATIONS

Lowagie, Bruno, "Chapter 7. Making documents Interactive," Get iText in Action, Second Edition, 2011.
(Continued)

*Primary Examiner* — Anand Loharikar
(74) *Attorney, Agent, or Firm* — Pillsbury Winthrop Shaw Pittman, LLP (57) ABSTRACT

An electronic commerce system configured to implement a product ordering method for receiving a product search inquiry from an input device, displaying a plurality of products in a product listing available from purchase based on the product search inquiry on an output device, receiving a selection of a product, and displaying a first product information page including at least a product name, a product price, general product information, a first product ordering link for accessing a product ordering interface and a product information detail link. The system further includes a secondary product information display system configured to display a product datasheet including the product name, the general product information, product technical information and a commercial function display including at least one of a second product ordering link for accessing the product ordering interface and an inventory reporting display.

14 Claims, 11 Drawing Sheets

(58) Field of Classification Search
USPC .............................................. 705/26.1–27.2
See application file for complete search history.

(56) References Cited

U.S. PATENT DOCUMENTS

| | | |
|---|---|---|
| 7,246,308 B1 | 7/2007 | Leblang et al. |
| 7,475,024 B1 | 1/2009 | Phan |
| 7,664,757 B1 | 2/2010 | Boesjes |
| 2002/0029168 A1 | 3/2002 | McConnell et al. |
| 2002/0107845 A1 | 8/2002 | Takahashi |
| 2002/0112114 A1 | 8/2002 | Blair et al. |
| 2004/0267613 A1 | 12/2004 | Chan et al. |
| 2005/0125313 A1 | 6/2005 | Untiedt et al. |
| 2008/0091846 A1 | 4/2008 | Dang |
| 2011/0082850 A1 | 4/2011 | Ball et al. |
| 2011/0131478 A1 | 6/2011 | Tock et al. |
| 2012/0066253 A1 | 3/2012 | Osborn et al. |
| 2012/0297278 A1 | 11/2012 | Gattani et al. |
| 2012/0315009 A1 | 12/2012 | Evans et al. |
| 2013/0063745 A1 | 3/2013 | Tecu et al. |
| 2013/0096938 A1 | 4/2013 | Stueckemann et al. |
| 2013/0124193 A1 | 5/2013 | Holmberg |
| 2013/0151946 A1 | 6/2013 | Rioux et al. |
| 2013/0174268 A1 | 7/2013 | Wang et al. |
| 2013/0191728 A1 | 7/2013 | McKinney et al. |
| 2013/0268408 A1 | 10/2013 | Mebed et al. |
| 2013/0277422 A1 | 10/2013 | Weinberg |

FOREIGN PATENT DOCUMENTS

| | | |
|---|---|---|
| CN | 102957663 | 9/2015 |
| WO | 00/79418 | 12/2000 |
| WO | 2008042822 | 7/2008 |

OTHER PUBLICATIONS

"Warning! Human Judgment Required for PDF/US Conformance," Duff Johnson Strategy & Communications, Feb. 14, 2013 (6 pages).

STANCOR

Stancor Products —— 302

This page lists links to catalog pages for Stancor products and product information. Catalog pages are in Adobe® PDF format.

*Note: Adobe® Acrobat® Reader is required to view catalog pages.*

Power Transformers
- Single Secondary P-
- Single Primary, Dual Secondaries P-
- Single Primary, Multiple Secondaries P-, PCA-
- Dual Primary, Dual Secondaries P-
- Rectifier Transformers RT-
  - Rectifier Transformers - Terminal Connection Data
- Filter Chokes C-, TC-
- Power Transformer Outline Drawings Installation Instructions

Chassis Mount Power Transformers
- TransGlobal Transformer TGC-
- "Side-Winder" Transformer SWC-, DSWC Installation Instructions

Impedance Matching Transformers
- Telephone Coupling TTPC-
- Miniature Encapsulated PCT-          —— 310

Printed Circuit Transformers
- TransGlobal Printed Circuit Mount TG-
- "Low Boy" LB Series LB-
- "Side-Winder" SW/DSW Series SW-, DSW-
- Plug-in Printed Circuit Series PPC- Installation Instructions

Power Sources Wall Plug-In/Desktop
- Domestic STA-, STAR-
- European STAF-

Auto/Isolation Transformers
- Step-Down Transformers P-, GSD-
- Step-Up Transformers P-
- Isolation Transformers P-, GIS-, GISD-
- General Information Installation Instructions

Class 2 Transformers
- Class 2 Transformers S92-, T-

Installation Instructions

Disc Thermostats
- Snap Action Thermostats STC-, STO

Relays and Contactors
- D.C. Power Contactors
  - Type 70
  - Type 120
  - Type 124
  - Type 586
  - Type 686
- General Purpose Relays 184-
- General Purpose Relays 91-
- A.C. Power Relays 129-
- A.C. Power Contactors 122-
- A.C. Power Contactors 154-

Sidebar: Home, Quick Selection Guide, Products, Contact Us

IMPEDANCE MATCHING TRANSFORMERS

Telephone Coupling

Telephone Coupling Transformer

Click on the [Buy Now] button for price, availability and online order entry

| Sec. | STANCOR PART NUMBER | Buy Now | Schematic Number | Style | Impedance Primary ±15% | Secondary ±10% | D.C. Curr. mA. | Insertion Losses db Max @1K Hz | Primary DCR | DIMENSIONS-INCHES W | L | H | A* | B** | C | Weight (oz.) |
|---|---|---|---|---|---|---|---|---|---|---|---|---|---|---|---|---|
| A | TTPC-2 | [BuyNow] | 1 | B | 600 | 600 | 0 | 1.2 | 46 | 0.781 | 0.6500 | .490 | - | .145 | 0.530 | 0.5 |
| B | TTPC-6 | [BuyNow] | 3 | A | 600 | 600 C.T. | 90 | 1.8 | 71 | 0.815 | 0.6500 | .750 | - | .187 | 0.421 | 1.0 |
|   | TTPC-8 | [BuyNow] | 2 | A | 600 C.T. | 600 C.T. | 0 | 1.2 | 36 | 0.781 | 0.6500 | .740 | - | .187 | 0.421 | 0.6 |
| C | TTPC-11 | [BuyNow] | 5 | A | 4000 | 600 | 0 | 1.2 | 225 | 0.781 | 0.6500 | .740 | - | .187 | 0.421 | 0.6 |
|   | TTPC-13 | [BuyNow] | 4 | C | 600 | 600 C.T. Split | 90 | 1.8 | 73 | 0.815 | 0.7500 | .625 | .150 | .209 | 0.500 | 0.5 |
|   | TTPC-14 | [BuyNow] | 6 & 7 | D | 600 | 600 C.T. Split | 80 | 1.1 | 74 | 1.650 | 1.3700 | .660 | .200 | .250 | 1.000 | 2.5 |

--- Maximum Operating Temperature 105°C
--- Dielectric Strength 1500 VRMS
--- Maximum distortion 0.5% at 300-3.5K Hz
--- Frequency Response ± 0.5db 300-3.5K Hz
— Longitudinal Balance:
  60db Min @ 200-1K Hz
  40db Min @ 4K Hz
* Pin 1 to 2 only.
** Typical dimension pin to pin.

For outline drawings refer to page 20.

SCHEMA TIC 4

SCHEMA TIC 1

SCHEMA TIC 5

SCHEMA TIC 2

SCHEMA TIC 6

SCHEMA TIC 3

SCHEMA TIC 7

SYSTEM AND METHOD FOR PROVIDING COMMERCIAL FUNCTIONALITY FROM A PRODUCT DATA SHEET

CROSS REFERENCE TO RELATED APPLICATIONS

This application claims the benefit of U.S. patent application Ser. No. 13/840,584, filed Mar. 15, 2013 and is hereby incorporated by reference.

FIELD OF THE INVENTION

The present invention relates to systems and methods for implementing a commercial function, such as product inventory reporting and product ordering. Specifically, the present invention relates to a system and method for providing commercial functionality including inventory reporting and/or ordering functionality on a technical product datasheet.

BACKGROUND

Consumers and businesses are increasingly using electronic commerce systems to obtain goods and services. Electronic commerce systems are particularly useful for obtaining goods that are not typically available in a local marketplace. For example, electronic commerce systems are increasingly being used as the preferred shopping venue to obtain products used in highly technical applications, such as electrical and electronic components.

Electronic commerce systems are useful in sales of highly technical components because consumers of these components tend to be geographically diverse. Further, consumers of the components tend to have nonuniform demand for any particular component. The combination of these two aspects of technical component sales requires that retailers of these components provide a large selection of diverse components to an extensive customer base to compensate for the nonuniform demand. These demands are typically satisfied using electronic commerce systems.

In order to meet the needs of this diverse customer base, electronic commerce systems typically provide multiple levels of information that can be accessed by a consumer for each product offered for sale. For example, an electronic commerce system may provide a generic component search engine allowing a consumer to search for a particular electronic component by, for example, manufacturer name, price point, part number, component name, etc. The generic component search engine is configured to identify one or more components, typically a listing of multiple components, satisfying the search criteria entered by the consumer.

However, for sales of highly technical components, the information typically displayed by a generic component search engine, or even a component specific display page, is insufficient for the specialized consumers of these types of components. Accordingly, electronic commerce systems typically provide a link in the search result listings and/or the component specific display page that initiates the display of a product datasheet describing the component in further detail.

A datasheet or spec sheet is a document providing detail information regarding the performance and other technical characteristics of a product, machine, component, material, subsystem, or software, hereinafter described as a component for simplicity, in sufficient detail to be used by a consumer to determine the suitability of the item for satisfying the consumer's needs. Datasheets are an important part of how engineers evaluate and buy products. Typically, a datasheet is created by the component manufacturer and thereafter provided by the manufacturer, representatives, distributers, etc.

A datasheet typically begins with an introductory page describing a remainder of the document. The remainder of the document typically includes listings of specific characteristics, information on the connectivity of the device, source code, engineering tolerances, inputs and outputs, timing diagrams, physical specifications, etc. As can be appreciated, the datasheet is generally an extensive, detailed document and is thus unsuitable for display in the listing of results from the search engine or even on a component specific product ordering page.

Although providing data sheets for highly technical components has been recognized as necessary for implementing an electronic-commerce site, integration of the data sheets with electronic commerce systems has been limited. Data sheets are typically provided as static documents, such as PDF documents, accessible by a link from the search result listing and/or component specific display page. Accordingly, a consumer viewing, for example on a distributers web site, a component specific display page and needing additional information is required to click on the link to navigate to a separate page and/or open a separate window, for example at a manufacturer's web site, displaying the datasheet, review the information and then navigate back to the component specific display page if the component proves satisfactory after reviewing the datasheet.

Thus, what is needed is a system and method for providing commercial functionality such as inventory reporting or purchasing functionality in a datasheet display for a particular component accessed through a component specific purchasing page. What is further desirable is such a system and method further configured to display inventory information for a plurality of independent inventory systems.

SUMMARY

The present invention provides a system and method for providing product data sheets or spec sheets, accessible through a traditional electronic commerce system, configured to include commercial functionality, such as inventory reporting and/or purchasing functionality. Accordingly, a system and method in accordance with the present invention allows consumers to perform these functions without backtracking to a website landing page, where such inventory reporting and/or purchasing functionality has traditionally been provided.

According to one exemplary embodiment, the system of the present invention includes a computer-implemented electronic commerce system including a primary product information display system including a computer processor, memory, an input device and an output device and configured to implement an inventory checking method and/or a product ordering method. The product ordering method includes receiving a product search inquiry from the input device, displaying a plurality of products in a product listing available for purchase based on the product search inquiry on the output device, receiving a selection of a product from the product listing, and displaying a first product information page including at least a product name, a product price, general product information, a first product ordering link for accessing a product ordering interface and a product information detail link. The system further includes a secondary product information display system configured to display additional information based on a selection of the product information detail link, including displaying a product datasheet including the product name, the general product information, product technical information and a commercial function display including a second product ordering link for accessing the product ordering interface. The inventory checking method includes receiving a product search inquiry from the input device, displaying a plurality of products in a product listing available for purchase based on the product search inquiry on the output device, receiving a selection of a product from the product listing, and displaying a first product information page including at least a product name, a product price, general product information, a first inventory checking link for accessing a product inventory checking interface and a product information detail link. The system further includes a secondary product information display system configured to display additional information based on a selection of the product information detail link, including displaying a product datasheet including the product name, the general product information, product technical information and a commercial function display including at least one of a second product inventory checking link for accessing the product inventory checking interface and an inventory reporting display.

According to another exemplary embodiment, a computer-implemented method for providing a modified product datasheet in an electronic commerce system includes receiving a product search inquiry at an electronic commerce computing system, providing a plurality of products in a product listing available from purchase based on the product search inquiry, receiving a selection of a product from the product listing, displaying a first product information page including at least a product name, a product price, general product information, a first product ordering link for accessing a product ordering interface and a modified product datasheet link and receiving a selection of the modified product datasheet link. The method further includes displaying a modified product datasheet including the product name, the general product information, product technical information and a commercial function display including at least one of a second product ordering link for accessing the product ordering interface and an inventory reporting display.

According to another exemplary embodiment, a computer-implemented method for generating a modified product datasheet includes receiving a product datasheet in an electronic format, generating a product ordering key for insertion in the product datasheet, generating a modified product datasheet including the product ordering key, and generating a link to the modified product datasheet for utilization in a product ordering or inventory checking interface.

Other features and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 3B is a product catalog including a link to the modified product datasheet of FIGS. 4A-4B, according to an exemplary embodiment;

FIGS. 5A-5D are computer implemented ordering and inventory reporting displays implementing functionality accessible through the modified product datasheet of FIGS. 4A-4B

Before explaining embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 1:
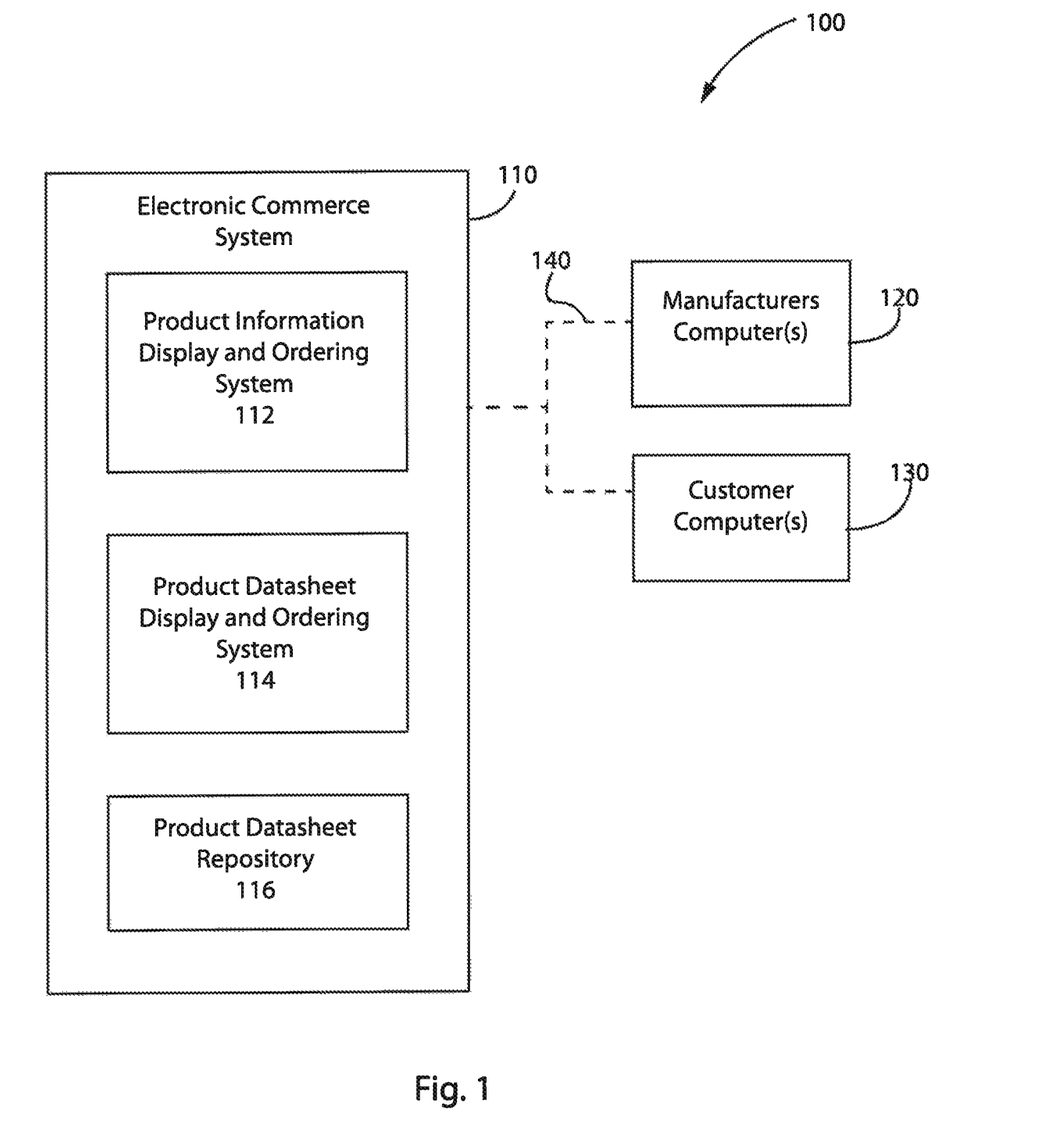
FIG. 1 is a block diagram illustrating an electronic commerce environment including an electronic commerce product ordering system, according to an exemplary embodiment.

Referring now to FIG. 1, an electronic commerce environment 100 for providing product datasheet based commercial functionality, such as inventory information reporting and functionality, is shown according to an exemplary embodiment. System 100 includes an electronic commerce computing system 110 configured to receive product information from one or more manufacturer computer systems 120 and display the product information to one or more customer computers 130 in an electronic environment. Communication between systems 110-130 may be provided through a communication network 140, such as the Internet. Although system 100 is shown and described as including particular systems and devices in a particular configuration, it should be understood that system 100 may alternatively include more, less, and/or a different combination of devices and systems configured to implement the functionality described herein.

Electronic commerce system 110 is configured to include a product information display and ordering system 112 configured to display basic product information and allow product ordering as is known in the art. However, electronic commerce system 110 is configured to further provide modified product datasheets for the product featured in the display of product information display and ordering system 112. Accordingly, electronic commerce system 110 further includes a product datasheet inventory information and ordering functionality system 114 configured to display a modified product datasheet including additional functionality as described in further detail below with reference to FIGS. 2-4. The modified product datasheet may be instantaneously generated and/or may be provided from a product datasheet repository 116 based on selection of a product datasheet link in the product information display and ordering system 112.

Electronic commerce computer system 110 is presented as a block diagram intended to be representative of the wide range of large and small computer systems that may be used in computer networks of all types. For example, computer system. 110 may be a desktop computing system, a computer server, a laptop computing system, a handheld computing device, a smart phone, or any other web-enabled device configurable to allow a user to implement the electronic commerce functions described below. Electronic commerce system 110 may be implemented by a manufacturer, a representative, a distributer, a third party facilitating distribution, etc. Although only a single computing system 110 is shown in FIG. 1, it should be understood that the method and system described herein may be implemented using one or more different systems and/or devices.

Electronic commerce computer system 110 is utilized to manage and facilitate the plurality of activities associated with providing a web based sales environment or virtual store. Exemplary activities include, but are not limited to, buying and selling electronic components and providing information about the same to allow consumers to make informed buying decisions such as available inventory information, sample requests, white papers, notes, etc. The product information that is presented to the consumer is provided in at least two forms on system 110. For a first product information type, basic product identification information is provided such as a manufacturer name, a price, a part number, a component name, etc. For a second product information type, detailed product information is provided in a datasheet accessible through a link provided with the first product information type, as will be described in further detail herein with reference to FIGS. 2-4.

Communication network 140 is intended to be representative of the complete spectrum of computer network types including Internet and internet-like networks. Communication network 140 is utilized to allow communication between system 110 and any number of computer systems, of which computer systems 120-130 are representative.

Manufacturer computer system 120 is any type of computing device, similar to computing system 110, implemented by a manufacturer selling products through electronic commerce system 100. Although only a single manufacturer computer system 120 is shown in FIG. 1, it should be understood that there are likely to be a large number of manufacturer computer systems providing components that are sold through electronic commerce system 110. Manufacturer computer systems 120 are configured to transmit both the first product information type including information displayed on a landing page and a product or component datasheet, which is typically several pages in length and provided in a PDF format, for each product or component that they wish to sell on electronic commerce system 110. Product data sheets supplied by manufacturer computer systems 120 may be received by electronic commerce system 110 and stored within a product datasheet repository 116.

Consumer computer system 130 is similarly any type of computing system as described above with reference to computing systems 110 and 120, used by consumers to access information and conduct transactions with electronic commerce computing system 110 over network 140. Accessing information typically includes searching for products and, upon identifying a desired product, accessing the landing page displaying the first product information type and a link to a product datasheet for that product. For highly technical users, accessing information further includes accessing the product datasheet through the displayed link prior to completing a transaction for the product.

In operation, manufacturers, represented in FIG. 1 by manufacturer computers 120, contact electronic commerce system 110 in order to list their manufactured products or components for sale through the electronic commerce system 110. In order to facilitate such sales, manufacturers provide information to electronic commerce system 110 regarding the products to be offered for sale. The type of information that is provided may be highly variable depending on the nature of the product, manufacturer desires, requirements from electronic commerce system 110, etc.

According to one exemplary embodiment, the provided information includes a manufacturer specific webpage allowing consumers to identify and obtain basic information regarding the product and a technical datasheet describing all available information regarding the product that the manufacturer wishes to communicate to the consumer to facilitate the consumer's purchase and use of their product. The basic information may be provided, for example, as a webpage written in an HTML script including text, images, graphics, a manufacturer's logo, etc. A second type of information, the product datasheet, may be provided based on a link displayed on the webpage as a several page document, typically in PDF format, including text, figures, graphics, tables, charts, code listings, etc. According to an alternative embodiment, the basic information may be generated by electronic commerce system 110 based on a received product datasheet, and be configured to include a subset of information available on the product datasheet.

Based on receipt of the information from manufacturer's computer 120, electronic commerce system 110 implements a product data sheet modification function to allow system 110 to display the product datasheet including product inventory reporting and/or ordering functionality, as described in detail below with reference to FIG. 4. Electronic commerce system 110 may be further configured to modify the first type of information, such as the webpage, to include a link to the modified product datasheet including product inventory reporting and/or ordering functionality. Thereafter, the product identified in the received information may be offered for sale through the electronic commerce system 110 such that transactions for the product may be performed using either of product information display in ordering system 112 and product datasheet display in ordering system 114.

The product inventory and availability information may be obtained in any satisfactory manner. For example, and without limitation, the datasheet inventory search may be conducted through a manufacturer's inventory database in which the manufacturer is the supplier, a manufacturer-supplied database of authorized distributors, or distributor or retail databases of available products.

Figure 2:
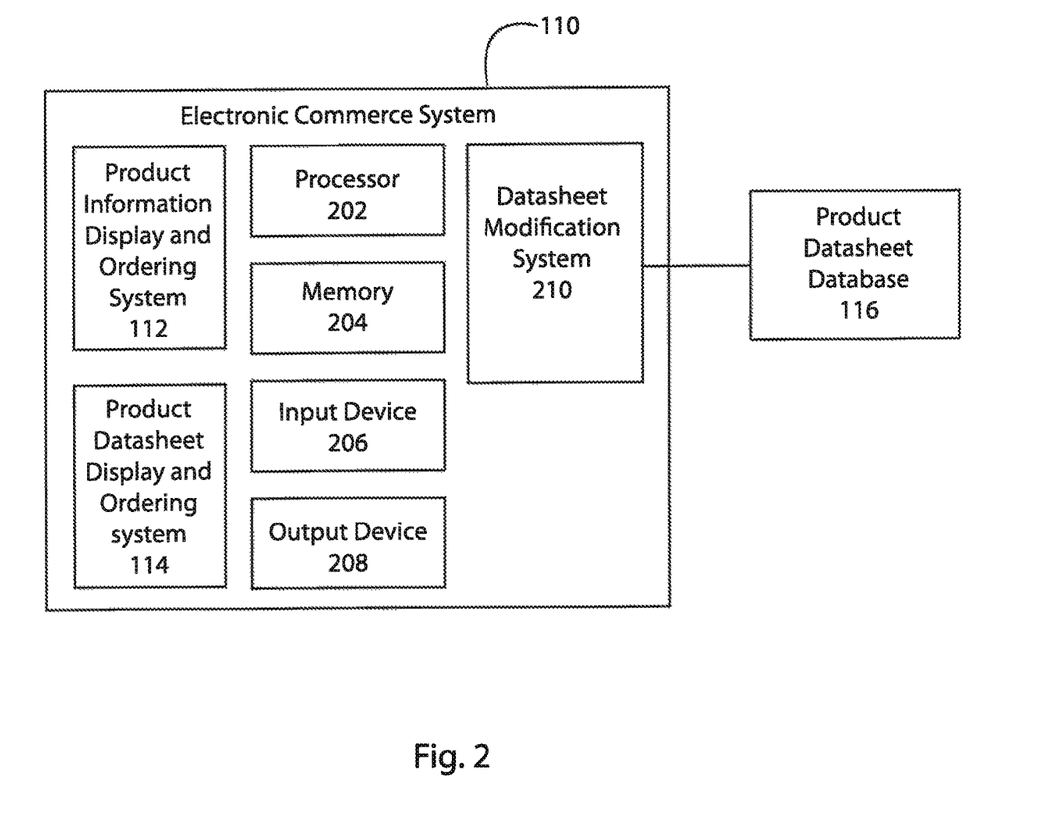
FIG. 2 is a block diagram illustrating the electronic commerce product ordering system of FIG. 1 in further detail, according to an exemplary embodiment.

Referring now to FIG. 2, electronic commerce system 110 is shown in further detail, according to an exemplary embodiment. System 110 may be implemented using a standard computing system configuration. For example, the present invention may be implemented by a computer processor 202 based on instructions stored in a computer-readable non-transient memory 204. The computer system 110 may be provided with conventional input devices 206, such as a keyboard, mouse, network input device, etc. and output devices 208, such as a computer monitor or network output device, to allow an operator of the system to interact with the computer programs implemented on the computer 110 and stored in memory 204.

Conventional memory 204 is provided as part of, or accessible by, the computer system 110. The memory 204, e.g., including disk memory, RAM, and/or ROM, etc., holds the various computer programs that are run on the computer system 110 to implement an electronic commerce system and method in accordance with the present invention. Such software includes the product information display and ordering system 112, the product datasheet display and ordering system 114, and a data sheet modification system 210 which, as will be described in more detail below, include a graphical user interface or other software for allowing a user to obtain and/or display information and perform an electronic transaction related to a product offered for sale or otherwise available through electronic commerce system 110. Memory 204 preferably also contains other conventional software programs necessary for general operation of the computer system 110. Based on the detailed functional description, flow chart diagrams, and exemplary screen displays provided herein, a person of ordinary skill in the art of software programming in the field of electronic commerce systems will be able to implement a system and method in accordance with the present invention without undue experimentation.

Figure 3A:
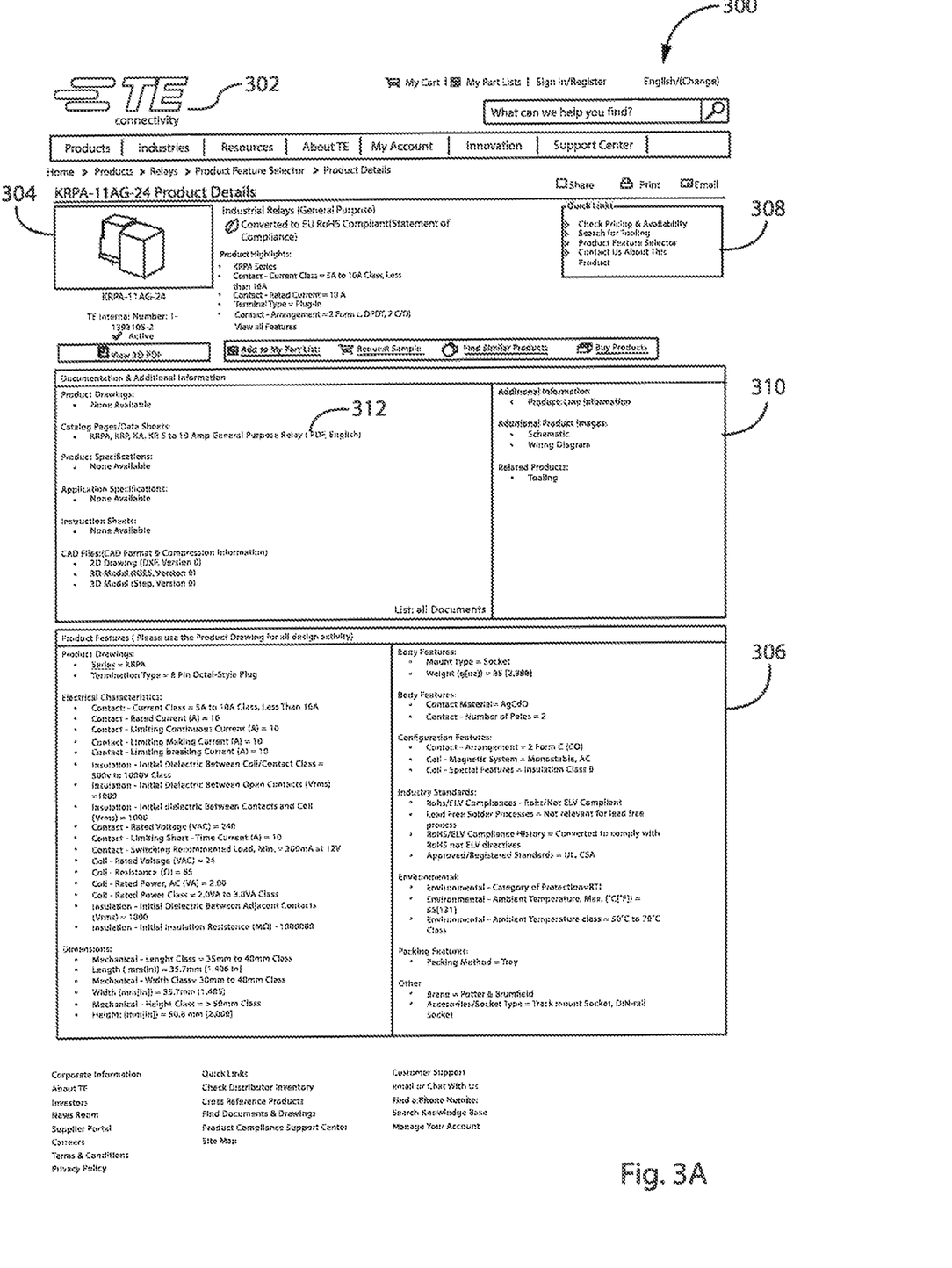
FIG. 3A is a product ordering interface including a link to the modified product datasheet of FIGS. 4A-4B, according to an exemplary embodiment.

Product information display and ordering system 112 may be a standard electronic commerce product display ordering interface, as is well known in the art, modified to include a link to a product datasheet configured to include product ordering and inventory reporting functionality. Referring now to FIG. 3A, an exemplary product display and ordering interface 300 is shown, according to an exemplary embodiment. Although interface 300 may be configured to include a wide range of both type and amount of information, the exemplary interface 300 shown in FIG. 3A includes a manufacturer identification information 302, product identification information 304, product feature information 306 including basic property and uses information for the specified product, product inventory reporting and ordering functionality 308, and product documentation links 310. It should be understood that interface 300 may be configured in a variety of different ways to achieve the functionality described herein. According to an exemplary embodiment, interface 300 may be provided by a manufacturer from a manufacturer computer 120 and displayed on electronic commerce system 110. The interface 300 may be displayed by a standard Internet browser interpreting HTML, JavaScript and/or other known programming languages.

However, as described in further detail below, product documentation links 310 may be modified by datasheet modification system 210 to link to a datasheet configured to include inventory reporting and ordering functionality, such as shown and described below with reference to FIG. 3B, as opposed to a product data sheet supplied by manufacturer computer 120. Accordingly, product documentation links 310 may be configured to include a modified product datasheet link 312 configured to initiate the display of a datasheet configured to include inventory reporting and ordering functionality provided by product datasheet display in ordering system 114.

Referring now to FIG. 3B, a product information catalog 320 is shown that includes manufacturer identification information 302, a product listing 322, and product documentation links 310 for a plurality of products. It should be understood that interface 300 may be configured in a variety of different ways to achieve the functionality described herein.

Figure 4A:
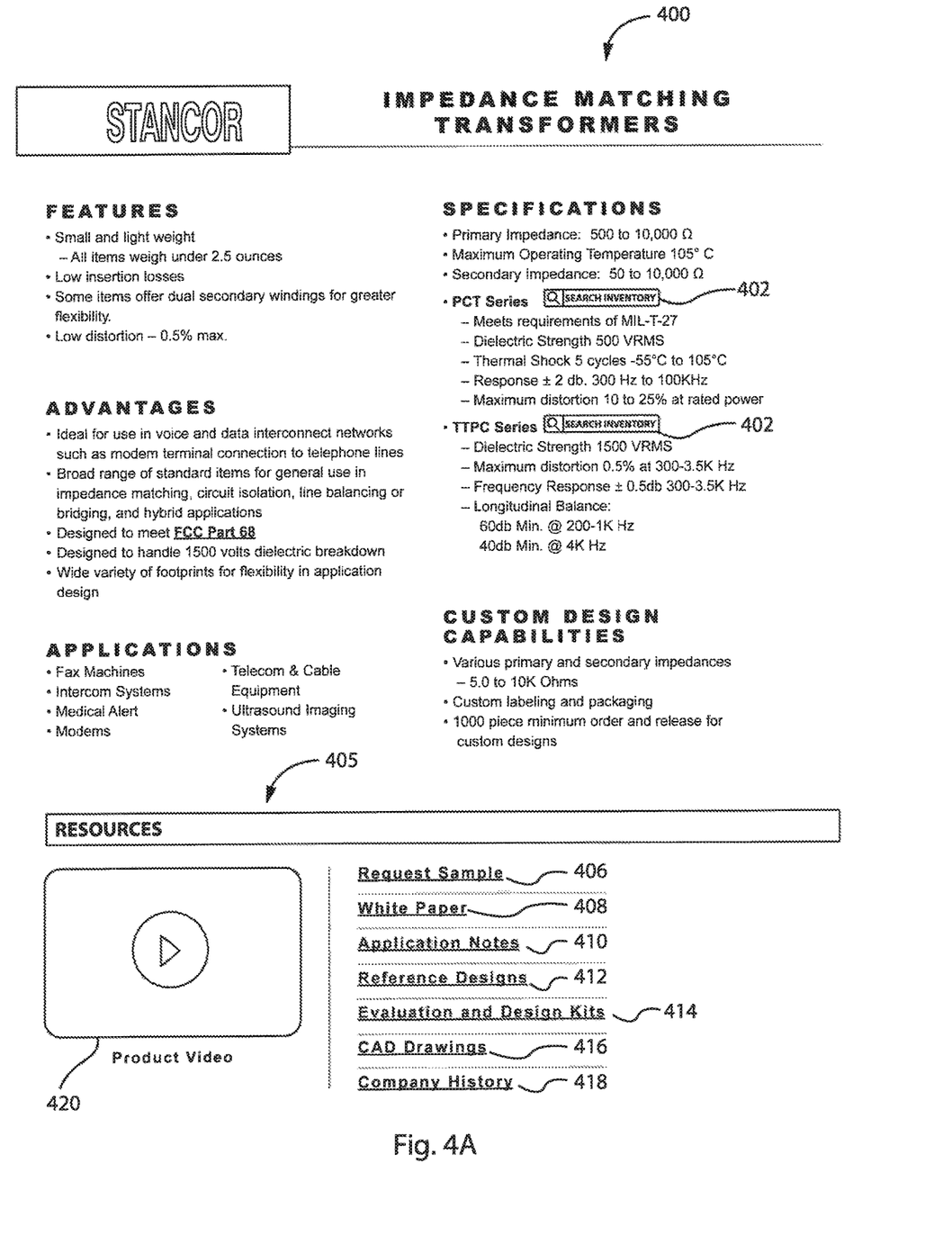
FIGS. 4A-4B are, respectively, first and second pages of a modified product datasheet including ordering and inventory reporting functionality, according to an exemplary embodiment.
Figure 4B:
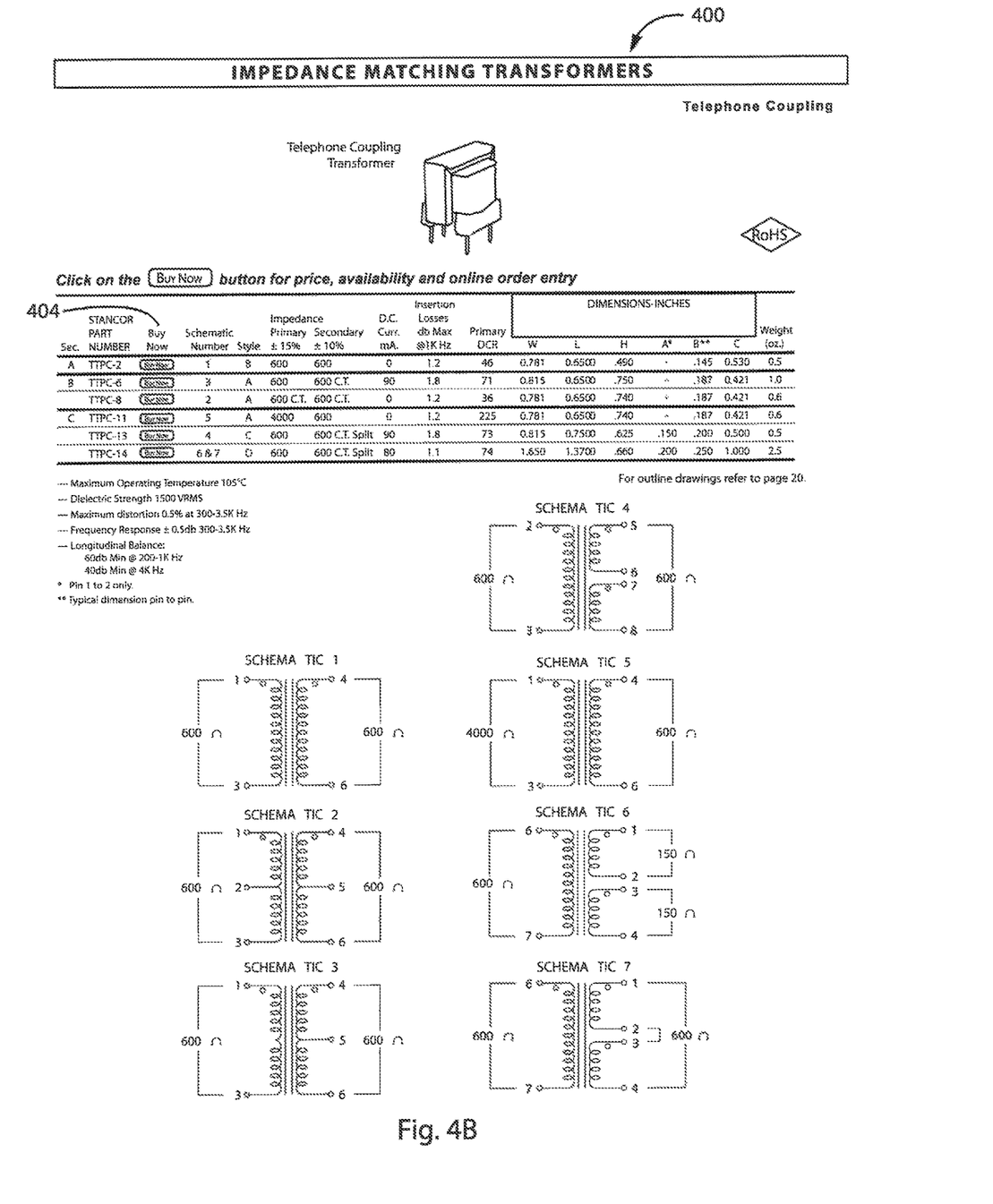

Referring now to FIGS. 4A and 4B, a first two pages of a modified product datasheet 400 including an inventory reporting function display 402, shown in FIG. 4A, and an order function link 404, shown in FIG. 4B, is shown, according to an exemplary embodiment. Although only two pages are shown, it should be understood that a product datasheet may include any number of pages, each of which may be configured as described herein. Product datasheet 400 may be a standard product datasheet including extensive detail information regarding the product shown in interface 300 and/or catalog page 320. According to an exemplary embodiment, product datasheet 400 is configured to be a superset of information displayed in interface 300 regarding the product. Product datasheet 400 is displayed to a user based on a selection of a modified product datasheet link 310 rendered on interface 300.

Product ordering function link 404 may be configured to initiate display of an ordering interface (not shown) based upon selection of the link 404 on product datasheet 400. The ordering interface that is displayed may be the same ordering interface that would be displayed based upon selection of ordering functionality 308 on interface 300. Advantageously, selection of link 404 allows a consumer to purchase the product displayed on interface 300 directly from product datasheet 400 without requiring navigation back to ordering interface 300. In one embodiment, when link 404 is selected the ordering interface is preloaded with product name and model number information from the datasheet, so that the user simply fills in information unique to his or her order, such as quantity, color, etc.

Inventory reporting function display 402 and product ordering function link 404 may be cooperatively displayed to display inventories from a manufacturer computing system. 120 or other suppliers to display inventory levels that are available from the manufacturer and suppliers, and to associate a unique product ordering function link 322 with the manufacturer or one of the suppliers. Accordingly, a consumer may place an order with a particular manufacturer or a supplier directly from the product datasheet based on the determination that the manufacturer or selected supplier has sufficient inventory levels.

Product datasheet 400 may be further modified to include an additional functionality display 405. As shown in FIG. 4A for an example, product datasheet 400 may be modified to include a sample request link 406, a white paper link 408, an application notes link 410, a reference designs link 412, a evaluation and design kits link 414, a CAD drawings link 416, and a company history link 418. Additional links could include a link to product parameters, UL or code standards, etc. Datasheet 400 further includes a video link 420 linking a video file displaying for example, additional product views, component use in situ, a technical expert discussing the component, potential applications, etc. Also contemplated, although not shown in FIG. 4A, is technical chat interface configured to allow the consumer to exchange information between the consumer and manufacturer computer 120 and/or other consumers in a chat forum specific to the product of interface 300.

Figure 5A:
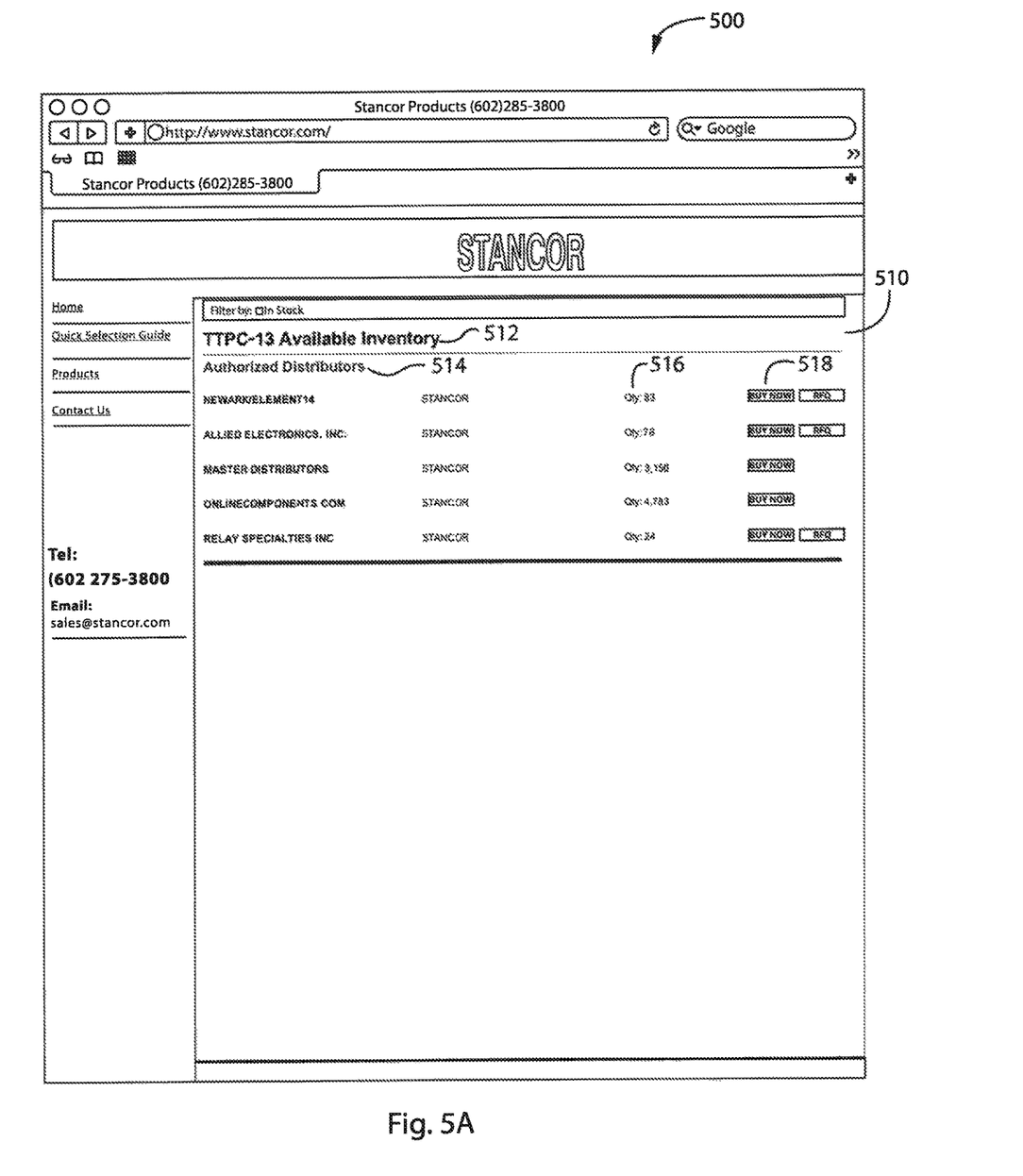

Referring now to FIGS. 5A-5D, clicking on the Inventory reporting function display 402 of a modified product datasheet 400 of FIG. 4A can be used to display an inventory reporting function display 500. Referring now to FIG. 5A, a single component inventory reporting display 510 is shown displaying inventory and pricing information for the single component available through a plurality of distributers, according to an exemplary embodiment. Display 510 is configured to include an identification of the component 512, a listing of distributers 514, inventory levels for each distributor 516, and ordering functionality 518. Ordering functionality 518 may include both a buy now function for purchases where price is fixed and a request for quotation for purchases is dependent on order size or any other variable.

Figure 5B:
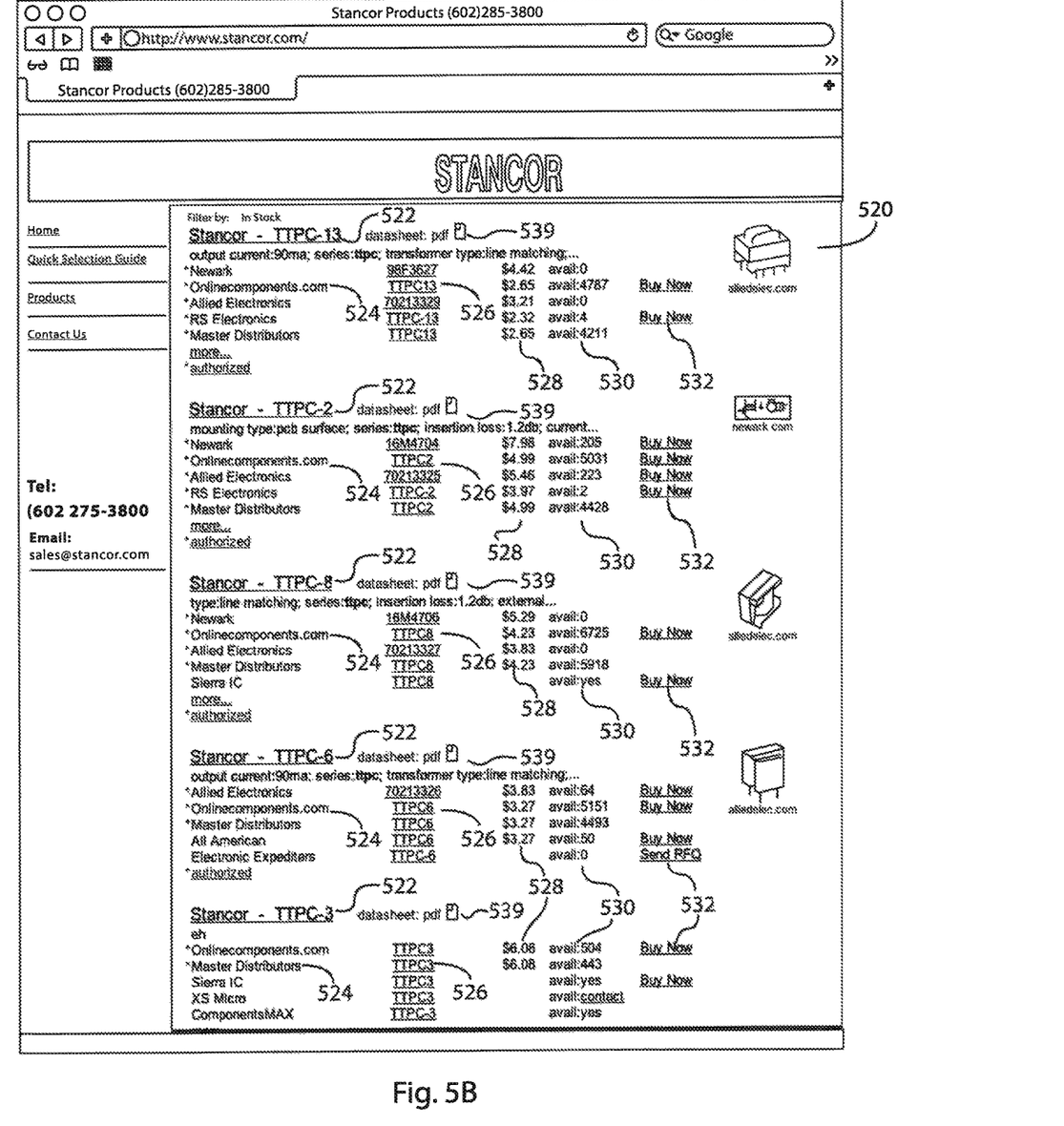

Referring now to FIG. 5B, a component family inventory reporting display 520 is shown displaying inventory and pricing information for a family of components available through a plurality of distributers, according to an exemplary embodiment. Display 520 is configured to include an identification of the component 522, a listing of distributers 524, distributer specific component identification information 526, pricing information 528, inventory levels for each distributor 530, and ordering functionality 532. Ordering functionality 518 may again include both a buy now function for purchases where price is fixed and a request for quotation for purchases is dependent on order size or any other variable. The listing may include a link to datasheet 400, shown in FIGS. 4A-4B.

Figure 5C:
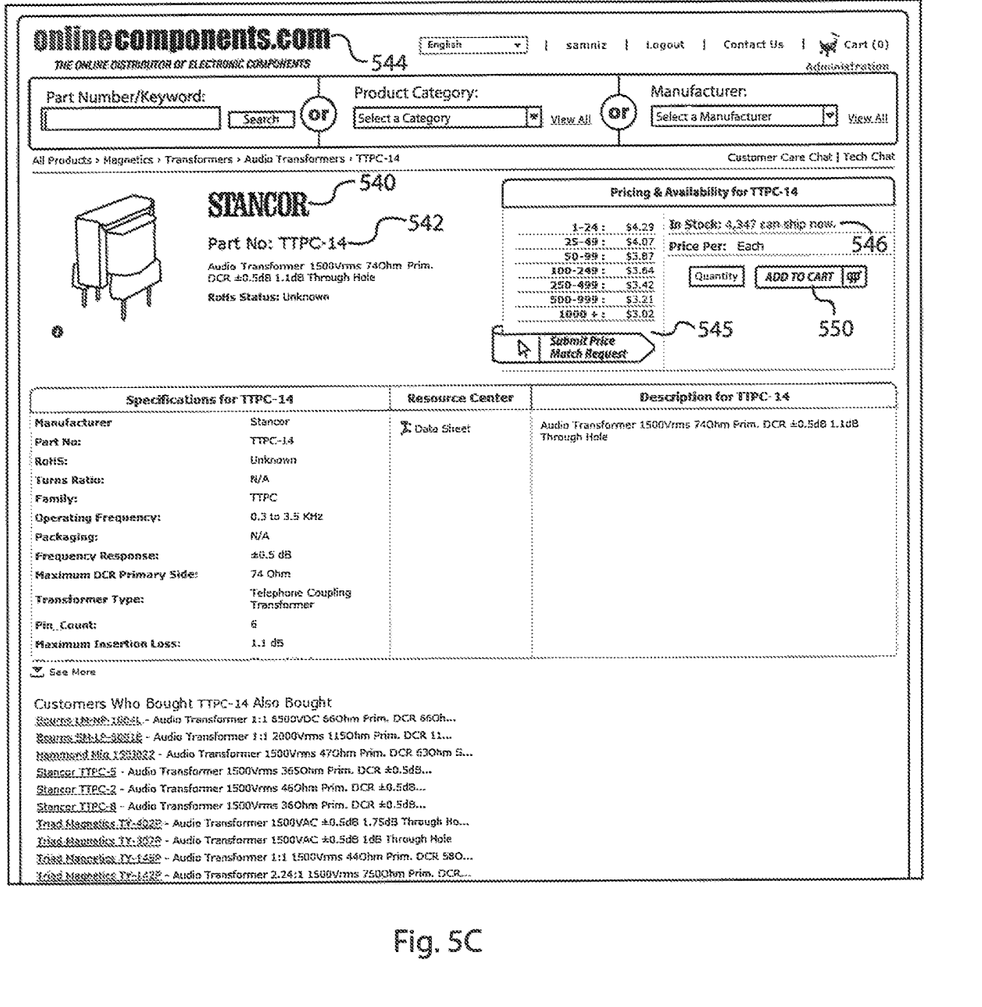

Referring now to FIG. 5C, a single component inventory reporting display 540 is shown displaying inventory and pricing information for the single component available through a plurality of distributers, according to an exemplary embodiment. Display 540 is configured to include an identification of the component 542, a distributer identification 544, inventory levels 546, pricing information 548, and ordering functionality 550. Ordering functionality 518 may include both a buy now function for purchases where price is fixed and a request for quotation for purchases is dependent on order size or any other variable.

Referring now to FIG. 5D, a component family inventory reporting display 560 is shown displaying inventory and pricing information for a family of components available through a single distributer, according to an exemplary embodiment. Display 560 is configured to include an identification of the components 562, inventory levels 564, and ordering functionality 566. The component listing may include a link 568 to datasheet 400, shown in FIGS. 4A-4B.

Inventory reporting function display 500 may alternatively be automatically displayed in the product displayed in interface 300. The inventory information that is displayed may be information available from a manufacturer computing system 120, information locally available through electronic commerce system 110, and/or information from a plurality of manufacturer computing systems 120 or other suppliers. The inventory information may be generated based on a periodic check of inventory levels and/or based upon a selection of modified product datasheet link 400. Display 500 may be configured to spawn an inventory information display as shown in FIGS. 5A-5B including additional details or may be configured to display inventory information directly on product datasheet 400 (not shown). Inventory reporting function display 500 may be implemented using JavaScript or other programming languages known in the art.

Figure 6:
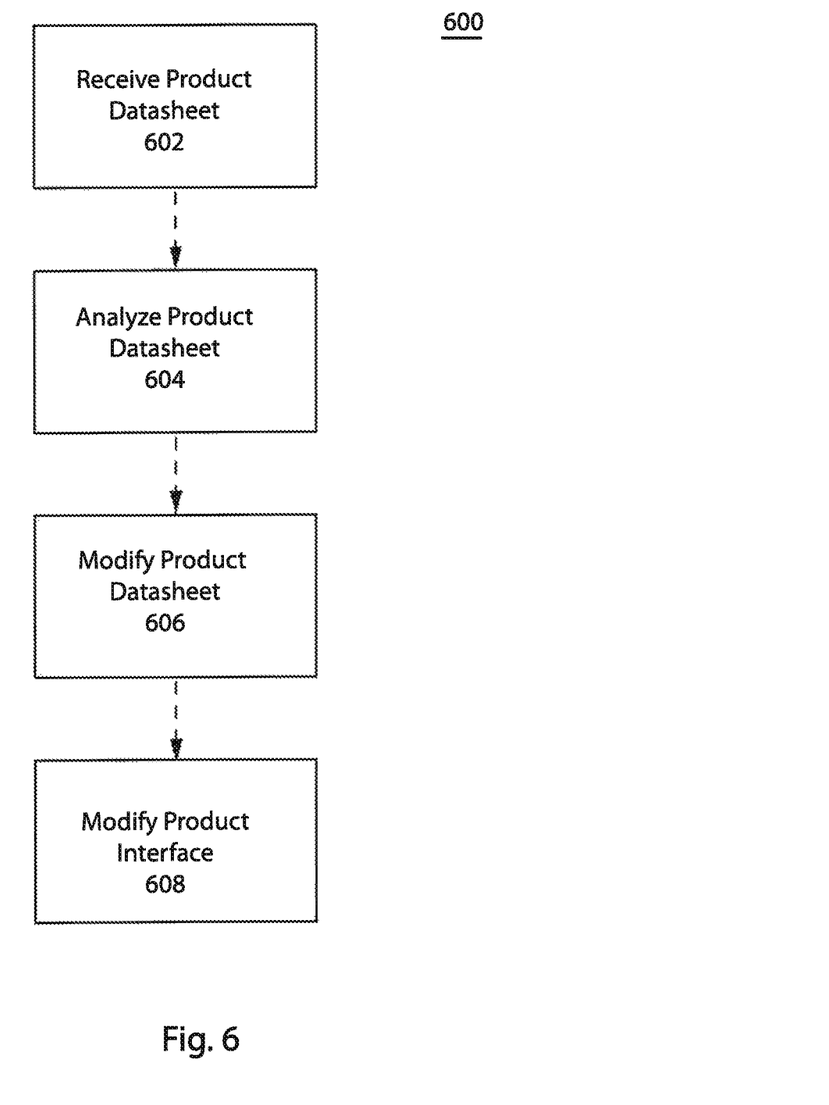
FIG. 6 is a flowchart illustrating a method for receiving and automatically modifying a product datasheet to include product ordering and/or inventory reporting functionality, according to an exemplary embodiment.

Referring now to FIG. 6, a flowchart 600 illustrating a method for receiving and modifying a product data sheet to include ordering and/or inventory reporting functionality is shown, according to an exemplary embodiment. The method of flowchart 600 may be implemented by the datasheet modification system 210, shown in FIG. 2. Although specific steps are shown and described as being performed in a specific order, it should be understood that the method of flowchart 600 may be limited using more, fewer, or and/or a different ordering of steps to implement the functionality described herein.

In a step 602, electronic commerce system 110 receives a product data sheet. The product datasheet may be transmitted from by the manufacturer to system 100, or may be obtained by accessing a manufacturer website and downloading the product datasheet, may be scanned from a printed copy of the product datasheet, etc. The received product datasheet is typically received in a PDF format, although system 110 may be configured to be able to perform the functionality described herein independent of the format of the product datasheet.

In a step 604, datasheet modification system 210 may be configured to analyze the received product datasheet to obtain product identification information. Alternatively, the product identification information may be obtained directly from the manufacturer, attached to the product datasheet in a macro file, etc. Datasheet modification system 210 may be further configured to obtain additional information, such as product application information, usable to configure functionality keys to be associated with the product datasheet.

In a step 606, the product datasheet is modified to include ordering and/or inventory reporting functionality. Data sheets are typically created using InDesign, a desktop publishing software package available from Adobe, Inc. The data sheets may then be provided as InDesign templates or converted to pdfs for use in system 110. The functionality may be added manually or automatically. For example, the links and information shown in FIGS. 4A-5D may be added based on detection of specific character sets in the received datasheets.

In a step 608, a product interface 300, shown and described above with reference to FIG. 3A, is modified to include a link to the generated modified product datasheet including ordering and/or inventory reporting functionality. Thereafter, a consumer selecting a product datasheet link 312 on interface 300 will be provided with the functionality to obtain inventory information and/or order the product directly from the product datasheet without requiring navigation back to interface 300.

Various alternatives are contemplated as being within the scope of the following claims particularly pointing out and distinctly claiming the subject matter regarded as the invention. It is also to be understood that, although the foregoing description and drawings describe and illustrate in detail one or more preferred embodiments of the present invention, to those skilled in the art to which the present invention relates, the present disclosure will suggest many modifications and constructions, as well as widely differing embodiments and applications without thereby departing from the spirit and scope of the invention.

It is claimed:

1. A computer-implemented electronic commerce system, comprising:
   a primary product information display system including a computer processor, memory, an input device and an output device and configured to implement a product ordering method, including
   receiving a product search inquiry from the input device,
   displaying a plurality of products in a product listing available for purchase based on the product search inquiry on the output device,
   receiving a selection of a product from the product listing, and displaying a first product information page including at least a product name, a product price, general product information, a first product ordering link for accessing a product ordering interface and a product datasheet display link; and a secondary product information display system configured to display a functional product datasheet based on a selection of the product datasheet display link, the functional product datasheet including
- a standard product datasheet, implemented as a static document, including the product name, the general product information and product technical information and
- a functional display added to the standard product datasheet without modifying the standard product datasheet and having at least one of a second product ordering link for accessing the product ordering interface and an inventory reporting display.

2. The system of claim 1, wherein the standard product datasheet is a PDF document.

3. The system of claim 1, wherein the functional product datasheet includes the second product ordering link implemented in JavaScript and is configured to include ordering information from the standard product datasheet including at least one of a product name and a product model number.

4. The system of claim 1, wherein the functional product datasheet includes the inventory reporting display implemented in JavaScript populated with inventory data obtained by transmitting information from the standard product datasheet to an external inventory reporting computer system.

5. The system of claim 4, wherein the inventory reporting display is configured to display inventory information for a single product from a plurality of suppliers of the selected product.

6. The system of claim 5, wherein the functional product datasheet includes at least one of a unique second product ordering link and a quotation request link for each of the plurality of suppliers of the selected product.

7. The system of claim 1, wherein the functional product datasheet is a template.

8. A computer-implemented method for providing a modified product datasheet in an electronic commerce system, comprising:
   receiving a product search inquiry at an electronic commerce computing system; providing a plurality of products in a product listing available for purchase based on the product search inquiry;
   receiving a selection of a product from the product listing;
   displaying a first product information page including at least a product name, a product price, general product information, a first product ordering link for accessing a product ordering interface and a product datasheet display link;
   receiving a selection of the product datasheet display link; and
   displaying a functional product datasheet based on the selection, the functional product datasheet including
   - a standard product datasheet, implemented as a static document, including the product name, the general product information and product technical information and
   - a functional display added to the standard product datasheet without modifying the standard product datasheet and having at least one of a second product ordering link for accessing the product ordering interface and an inventory reporting display.

9. The computer-implemented method of claim 8, wherein the standard product datasheet is a PDF document.

10. The computer-implemented method of claim 8, wherein the functional product datasheet includes the second product ordering link implemented in JavaScript and is configured to include ordering information from the standard product datasheet including at least one of a product name and a product model number.

11. The computer-implemented method of claim 8, wherein the functional product datasheet includes the inventory reporting display implemented in JavaScript populated with inventory data obtained by transmitting information from the standard product datasheet to an external inventory reporting computer system.

12. The computer-implemented method of claim 11, wherein the inventory reporting display is configured to display inventory information for a single product from a plurality of suppliers of the selected product.

13. The computer-implemented method of claim 12, wherein the product datasheet includes at least one of a unique second product ordering link and a quotation request link for each of the plurality of suppliers of the selected product.

14. The computer-implemented method of claim 13, wherein generating a functional product datasheet further includes displaying at least one of a sample request link, a white paper link, an application notes link, a reference designs link, an evaluation and design kits link, a CAD drawings link, and a company history link with the static standard product datasheet without modifying the standard product datasheet.

* * * * *